(No Model.) 4 Sheets—Sheet 1.

G. E. HUNTER & F. H. CORTHELL.
TIME PIECE MOVEMENT.

No. 455,046. Patented June 30, 1891.

Witnesses:
Jas. E. Hutchinson
Henry C. Hazard

Inventors:
Geo. E. Hunter and Fred. H. Corthell by
Chindler and Russell, their Attys (No Model.) 4 Sheets—Sheet 2.

G. E. HUNTER & F. H. CORTHELL.
TIME PIECE MOVEMENT.

No. 455,046. Patented June 30, 1891.

(No Model.) 4 Sheets—Sheet 3.
G. E. HUNTER & F. H. CORTHELL.
TIME PIECE MOVEMENT.

No. 455,046. Patented June 30, 1891.

Witnesses:
Jas. E. Hutchinson
Henry C. Hazard

Inventors
Geo. E. Hunter and Fred. H. Corthell, by
Prindle and Russell, their Attys.

(No Model.) 4 Sheets—Sheet 4.

G. E. HUNTER & F. H. CORTHELL.
TIME PIECE MOVEMENT.

No. 455,046. Patented June 30, 1891.

Witnesses:
Jas. E. Hutchinson
Henry C. Hazard

Inventors:
Geo. E. Hunter and Fred. H. Corthell, by
Crindle and Russell, their Attys

UNITED STATES PATENT OFFICE.

GEORGE E. HUNTER AND FRED H. CORTHELL, OF ELGIN, ASSIGNOR TO THE ELGIN NATIONAL WATCH COMPANY, OF CHICAGO, ILLINOIS.

TIME-PIECE MOVEMENT.

SPECIFICATION forming part of Letters Patent No. 455,046, dated June 30, 1891.

Application filed July 19, 1890. Serial No. 359,301. (No model.)

*To all whom it may concern:*

Be it known that we, GEORGE E. HUNTER and FRED H. CORTHELL, of Elgin, in the county of Kane, and in the State of Illinois, have invented certain new and useful Improvements in Time-Pieces; and we do hereby declare that the following is a full, clear, and exact description thereof, reference being had to the accompanying drawings, in which—

Figure 1:
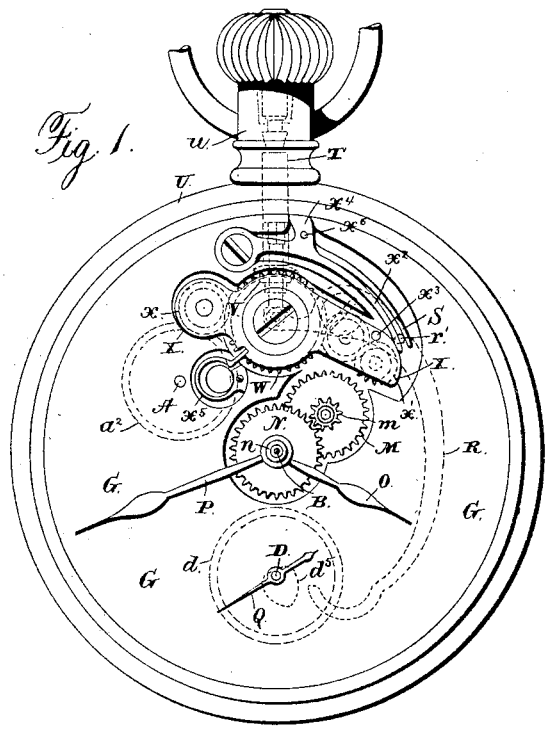
Figure 2:
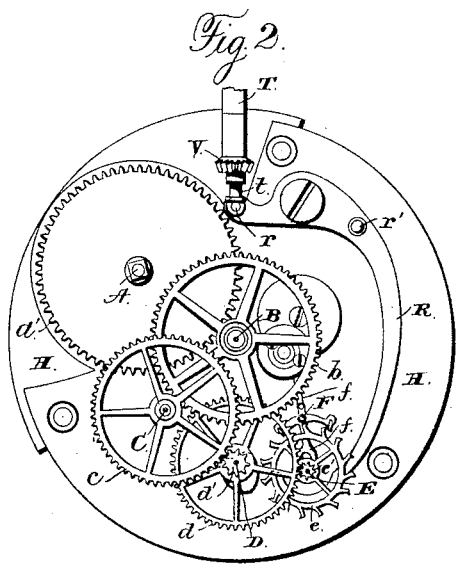
Figure 3:
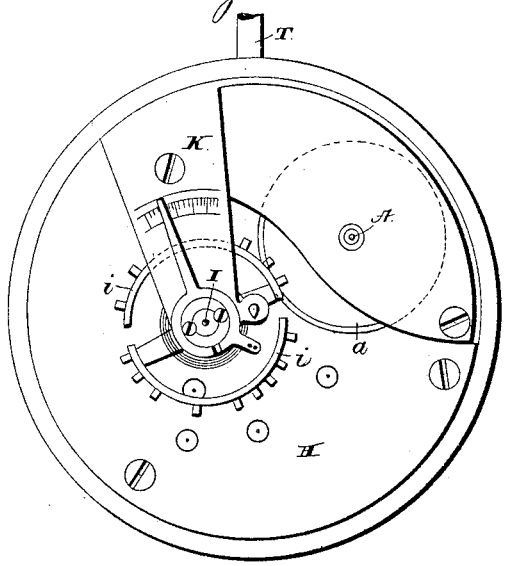
Figure 4:
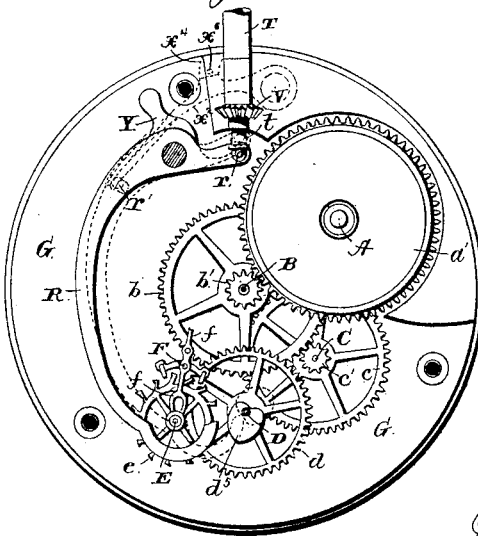
Figure 5:
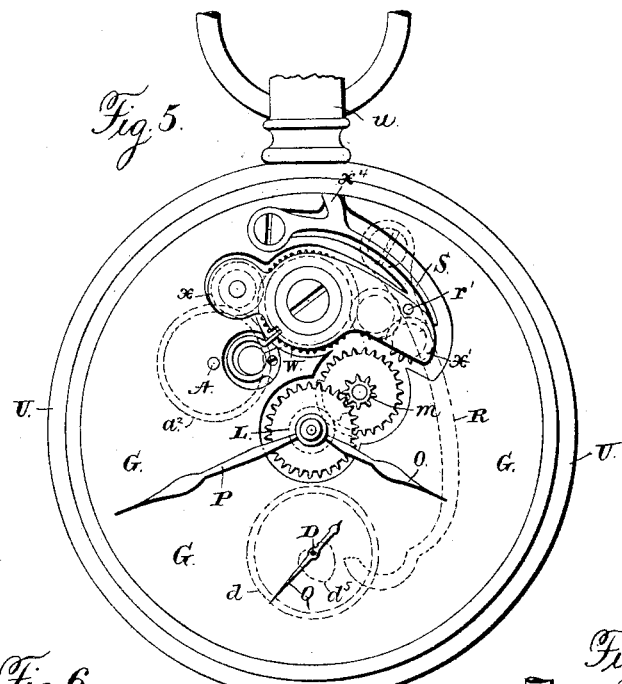
Figure 6:
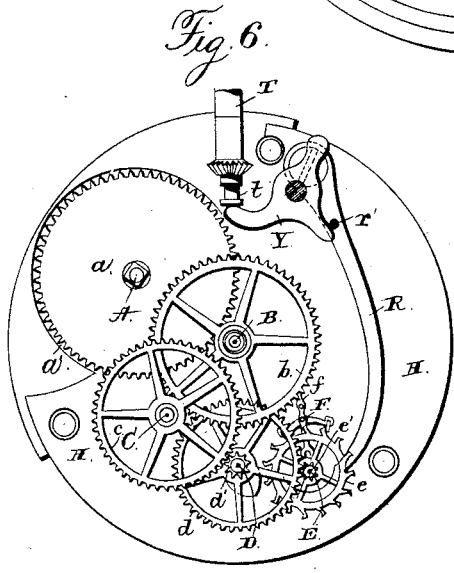
Figure 7:
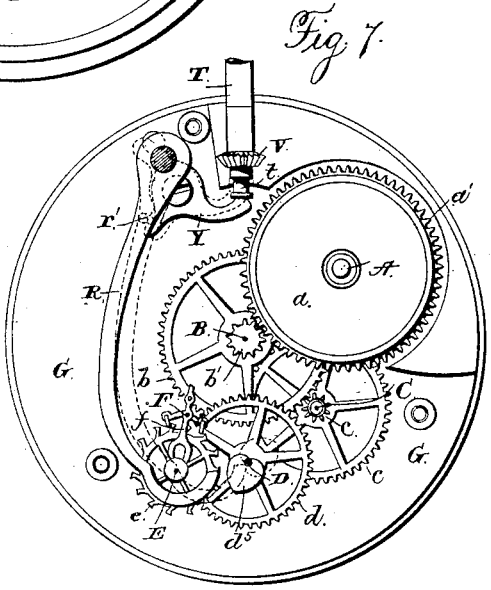
Figure 8:
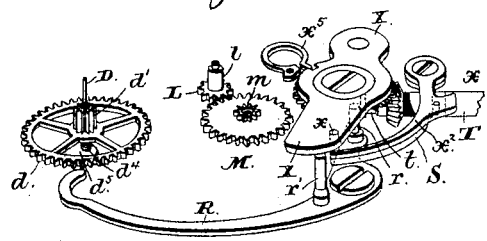
Figure 9:
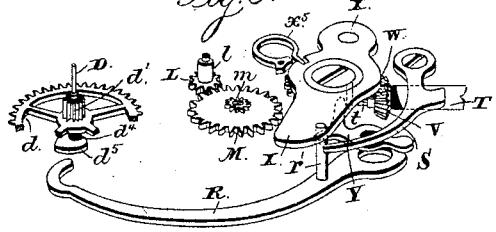
Figure 10:
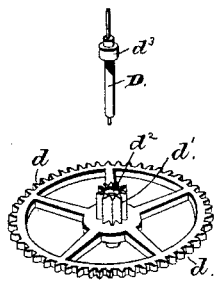
Figure 11:
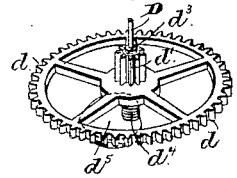
Figure 12:
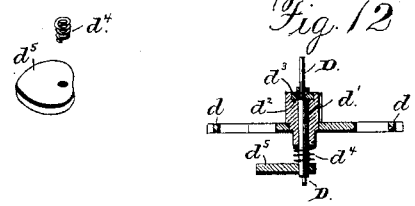

Figure 1 is a plan view from the front of a watch-movement containing our improvements. Fig. 2 is a like view of the same with the front plate removed. Fig. 3 is a plan view of such movement from the rear. Fig. 4 is a like view of said movement with the back plate removed. Figs. 5, 6, and 7 are views which correspond, respectively, to views 1, 2, and 4, and show a modification in construction. Figs. 8 and 9 are perspective views of the seconds-hand-setting devices shown in Figs. 1, 2, and 4, and 5, 6, and 7, respectively. Fig. 10 is an enlarged perspective view of the fourth arbor wheel and pinion separated from each other. Fig. 11 is a like view of the same when combined, and Fig. 12 is a section through the longitudinal axis of said arbor.

Letters of like name and kind refer to like parts in each of the figures.

Our invention relates to an improvement in time-pieces, for which an application for patent, Serial No. 359,300, is now pending in the Patent Office; and it consists in rendering inactive the mechanism for setting the seconds-hand at zero when the movement is out of its case, substantially as and for the purpose hereinafter specified.

In the carrying of our invention into practice we preferably employ the time mechanism shown, in which an arbor A, carrying a wheel $a$ and spring-barrel $a'$, a second arbor B, provided with a wheel $b$ and pinion $b'$, a third arbor C, having a wheel $c$ and pinion $c'$, a fourth arbor D, provided with a wheel $d$ and pinion $d'$, a fifth arbor E, carrying an escape-wheel $e$ and pinion $e'$, and a pallet-arbor F, having a pallet-lever $f$, are journaled between a front or pillar plate G and a back plate H. A balance-arbor I and wheel $i$, journaled between said front plate and a balance-bridge K, completes that portion of the time-train which is wholly or in part contained between said plates.

Upon the front end of the second arbor B is placed a cannon-pinion L, which is held thereon by frictional contact and engages a wheel M, that is journaled within a recess in the outer face of said plate. Said wheel is provided upon its outer face with a pinion $m$, which engages with the teeth of a wheel N, that is journaled upon the barrel $l$ of said cannon-pinion and is in turn provided with a barrel $n$, as shown. Said wheels and pinions constitute the usual dial-works of the watch and carry an hours-hand O, which is placed upon the barrel $n$, and a minutes-hand P, that is placed upon the barrel $l$ of the pinion L.

The wheel $d$ and pinion $d'$ are secured together and journaled upon the fourth arbor D, instead of being secured thereto, as has heretofore been the case. The front end of said pinion is provided with a recess $d^2$, which fits over a correspondingly-shaped collar $d^3$, that is formed upon or secured to said arbor, and is held against the same with a yielding pressure by means of a spiral spring $d^4$, which encircles the rear portion of said arbor and has one of its ends in engagement with the rear end of said pinion and the other end in engagement with a plate $d^5$, that is secured upon said arbor near its rear end, the arrangement being such as to unite said parts rotatively by friction, which, while sufficient to cause them to rotate together ordinarily, would not interfere with the movement of the time-train should said arbor be prevented from rotating.

The front end of the fourth arbor D carries a seconds-hand Q, and the frictional connection between said arbor and the time-train is for the purpose of enabling said hand to be set at zero, whenever desired, for which purpose the plate $d^5$ has the form of a heart-shaped cam, and is engaged upon its periphery, when permitted, by one end of a lever R, the opposite end of which is pivoted upon the back plate H, and by the action of a spring S is, when permitted, pressed against said cam with sufficient force to turn the latter to and hold it in normal position, with said seconds-hand pointing to zero.

The lever R may be operated by or through the lever of a "lever-set" watch; but in the watch shown it is manipulated through the stem-arbor T, which is capable of both longitudinal and rotary motion, and is held at the inner and outer limits of its longitudinal motion by means of locking mechanism that is contained within the stem or pendant $u$ of the case U. Said arbor has its inner end engaged by a hollow bevel-pinion V, which meshes with a wheel W, that is journaled within a recess in the outer face of the front plate G. Upon the axis of said wheel W is pivoted a yoke X, which at opposite ends carries pinions $x$ and $x'$, that are in constant engagement with said wheel, and by the oscillation of said yoke may be caused to engage with a wheel $a^2$ upon the main or spring-barrel arbor A or with the dial-wheel M, so as to cause the rotation of said stem-arbor to be communicated to said arbor A to wind the mainspring or to said dial-wheel M to set the hands.

The yoke X is normally held by a spring $x^2$ with a yielding pressure in such position as to cause engagement with the dial-wheels, but may be moved to the opposite limit of its motion, so as to produce winding engagement, by means of a lever Y, which is pivoted upon the inner face of the front plate G with one of its arms in engagement with the inner end of the stem-arbor T, or with a block $t$, that is contained within the pinion V and operates as a prolongation of said arbor, while its opposite end engages with a stud $x^3$, which projects from one end of said yoke through said plate G, the arrangement being such that when said stem-arbor is moved to the inner limit of its motion said yoke will be swung to cause winding engagement, while when said stem-arbor is moved to the outer limit of its motion said yoke is freed from constraint, and by the action of the spring $x^2$ is automatically moved into setting engagement.

An arm $r$, secured to or formed upon the lever R, is arranged to engage the block $t$, and when the stem-arbor T is at the inner limit of its motion said lever is held out of engagement with the cam $d^5$, but when said stem-arbor is drawn to the outer limit of its motion said lever is left free to be moved by the spring S, and impinging upon said cam moves the seconds-hand to zero and holds it there while the hours and minutes hands are being set and until said stem-arbor is again returned to its inner position.

In order that when the movement is out of the case the stem-train may be relieved from its normal engagement with the dial-wheels, spring $x^2$ is pivoted upon the front plate G and near its pivotal end is provided with a lug $x^4$, that extends radially outward, and when said movement is cased engages with the case-center and holds said spring under tension, while when the movement is out of the case said lug is free from engagement and said spring is relieved from restraint and ceases to exert any pressure upon the yoke X, and the latter by the action of a second weaker spring $x^5$ is automatically turned into winding engagement. This arrangement relieves the time-train from the necessity which would otherwise exist for unnecessarily carrying the stem-train, and prevents the dial-wheels from being in any degree obstructed, so as to cause the hands to fall behind and thus fail to indicate the true rate of said time-train.

The reasons which exist for automatically releasing the stem-train from its normal tendency to engage with the dial-wheels when the movement is out of the case apply with equal force to the seconds-hand-setting mechanism, and in case of the latter a like result is effected in a similar manner.

The spring S is pivoted at one end, so that when not under restraint it will turn upon its pivotal bearing and relieve the lever R from pressure. To place said spring under restraint a number of constructions may be employed, one of which is to provide it with a projecting lug to be engaged by the case, center, as in case of the spring $x^2$.

Another means, as shown in Figs. 1, 2, 4, and 8, is to pivot said spring S upon the screw which pivots said spring $x^2$, and below the latter, and provide within the lug $x^4$ a pin $x^6$, which extends downward outside of said spring S and engages with and moves the same into position for action whenever said spring $x^3$ is placed under tension. When the last-named construction is employed, a stud $r'$ from said lever R projects forward through an opening in the plate G into position for engagement with the end of said spring S.

Another arrangement (shown in Figs. 5, 6, 7, and 9) consists in causing the stud $r'$ of the lever R to engage with the yoke X, so as to cause said lever to be moved into and out of engagement with the cam-plate $d^5$ as said yoke swings to produce or break setting engagement between the stem-train and dial-wheels.

Other ways by which the desired result can be secured will readily occur to those skilled in the class of mechanism to which this invention belongs; but as the essence of our invention consists in an automatic suspension of the tendency to a normal engagement of the operating-lever and cam when the movement is taken from its case the constructions shown are a sufficient illustration of the same.

Having thus described our invention, what we claim is—

1. A time mechanism in which the seconds-hand may be set to and held at zero by mechanism that becomes automatically inoperative when the movement is removed from its case, substantially as and for the purpose specified.

2. A time mechanism in which the seconds-hand may be set at zero by mechanism which has a normal tendency to act when the movement is in its case and is automatically relieved of such normal tendency when the movement is removed from its case, substantially as and for the purpose shown.

3. A time mechanism in which is combined with a time-train a mechanism that is adapted to move the seconds-hand to zero and has a normal tendency to act only when the movement is in its case, substantially as and for the purpose set forth.

4. A time mechanism in which the seconds-hand is adapted to be set at zero by mechanism that is actuated by a spring which is operative for such purpose when the movement is within its case and becomes automatically inoperative when the movement is removed from its case, substantially as and for the purpose shown and described.

In testimony that we claim the foregoing we have hereunto set our hands this 9th day of June, A. D. 1890.

GEORGE E. HUNTER.
FRED H. CORTHELL.

Witnesses:
JNO. MCLAUGHLIN,
W. P. HEMMENS.